United States Patent [19]

Rieger et al.

[11] 4,316,537
[45] Feb. 23, 1982

[54] CHAIN CONVEYOR

[76] Inventors: Werner Rieger, Hau Häselbach; Horst A. Elsässer, Sauerbruch 15, both of 7084 Aalen-Unterkochen, Fed. Rep. of Germany

[21] Appl. No.: 159,199

[22] Filed: Jun. 13, 1980

[30] Foreign Application Priority Data

Jun. 19, 1979 [DE] Fed. Rep. of Germany ....... 2925045

[51] Int. Cl.³ ...................... B65G 19/24; B65G 19/00
[52] U.S. Cl. .................................. 198/731; 198/728; 403/353
[58] Field of Search ............... 198/731, 733, 728, 648; 59/93; 403/353

[56] References Cited

U.S. PATENT DOCUMENTS 1,186,774  6/1916  Harris .................................. 198/731
4,027,793  6/1977  Lampl ................................. 198/731

FOREIGN PATENT DOCUMENTS 558472   7/1957  Belgium ............................. 198/731
1148671 12/1957  France ............................... 198/728

Primary Examiner—Robert B. Reeves
Assistant Examiner—Brian Bond
Attorney, Agent, or Firm—Parmelee, Johnson, Bollinger & Bramblett

[57] ABSTRACT

For fixing conveyor elements (7) to the chain strands (5, 6) in a chain conveyor having two chain strands (5, 6) running over sprockets (1, 3), pairs of projections (9, 10) are used which grip one chain link in each case and which each have an arcuate outline on one side and are pivotably mounted on the conveyor element (7).

15 Claims, 14 Drawing Figures

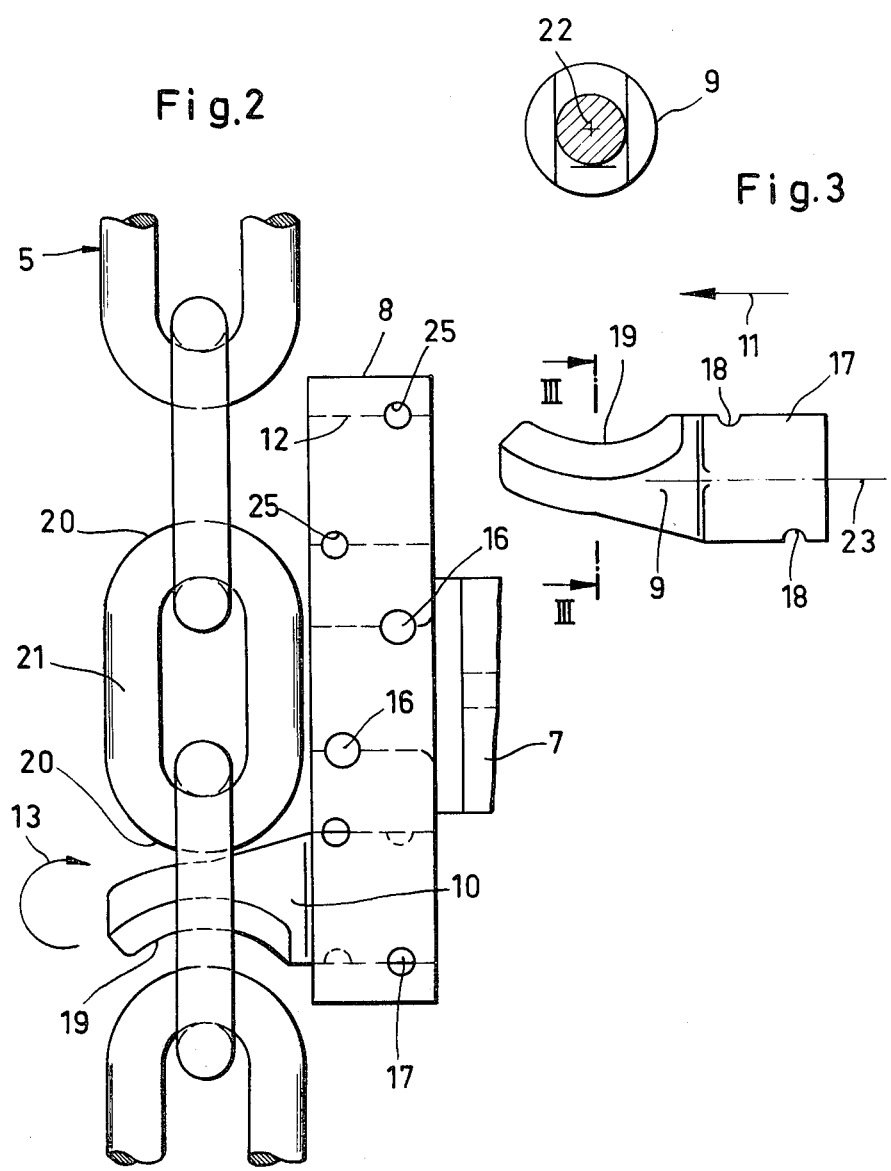

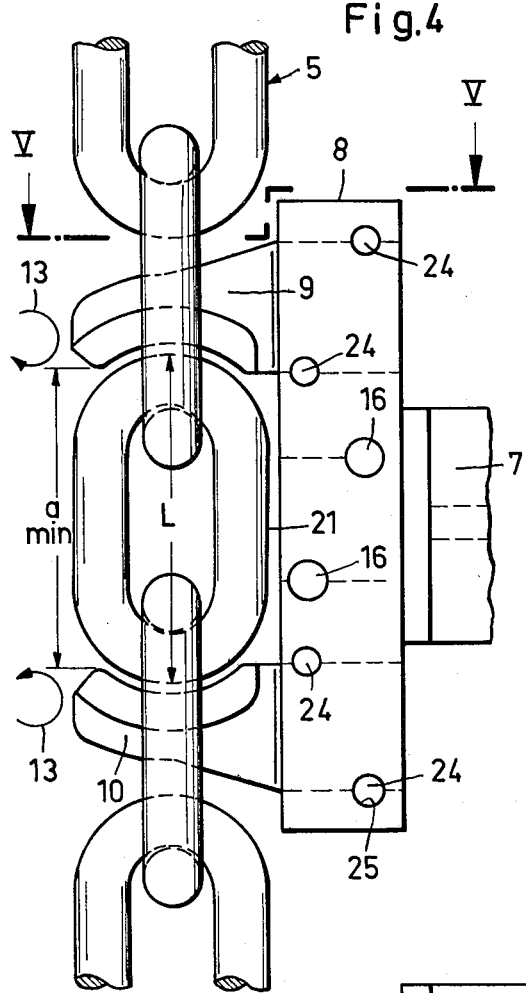
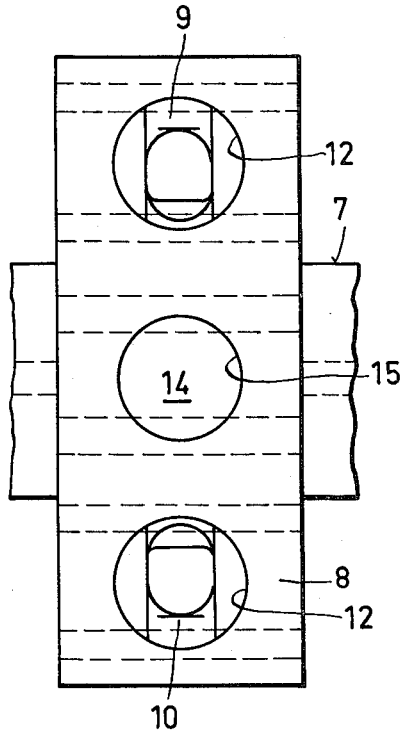
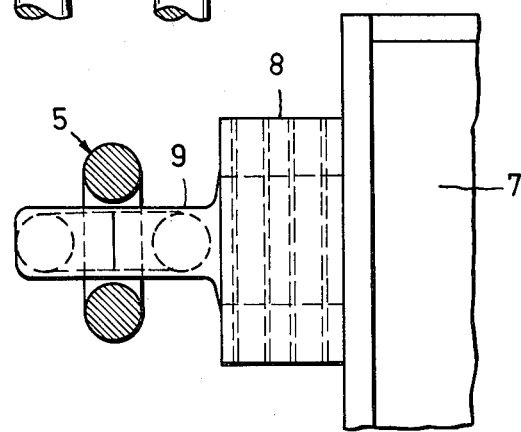

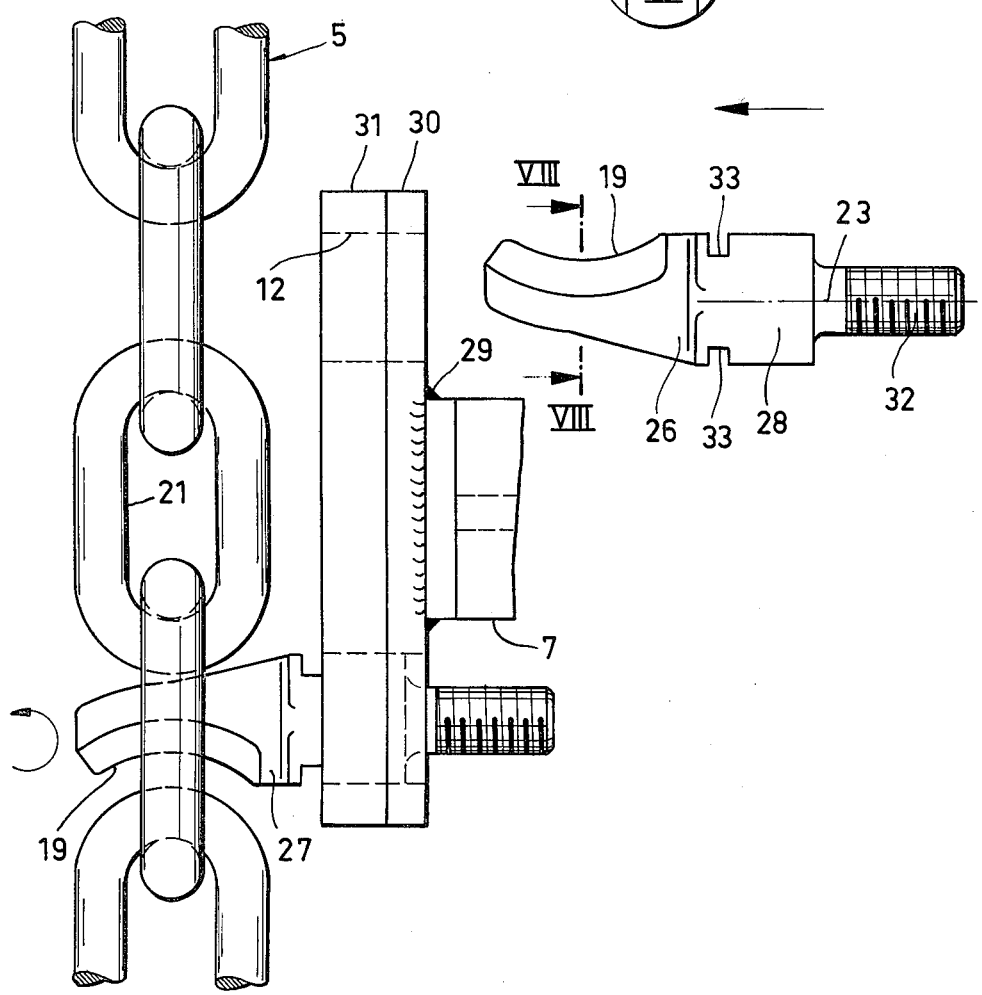

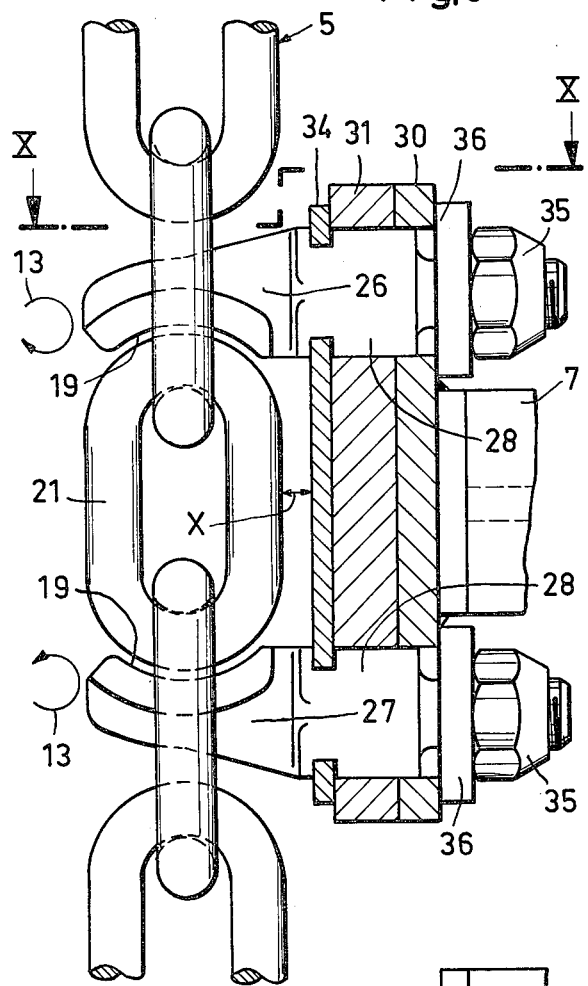
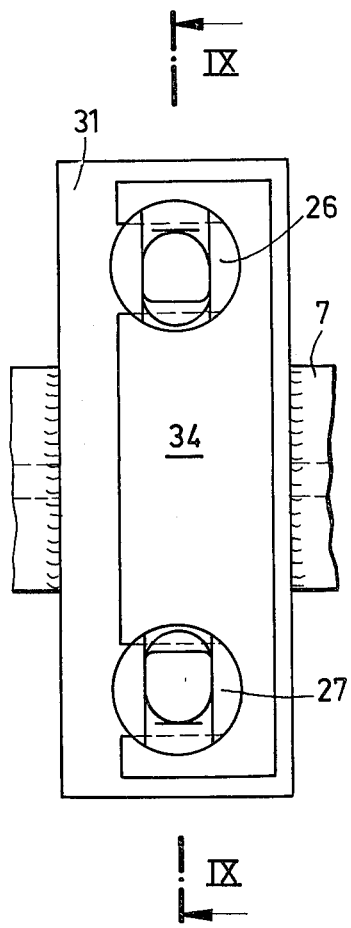
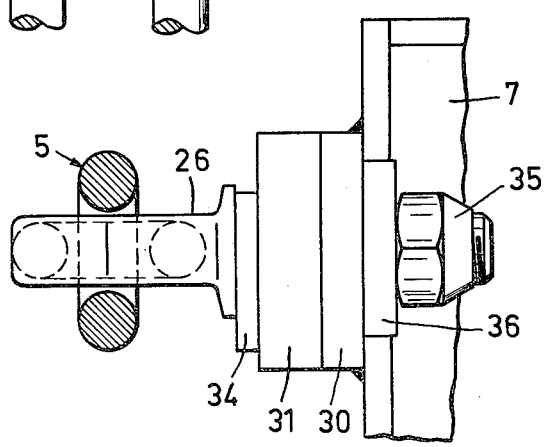

CHAIN CONVEYOR

The invention relates to a chain conveyor having at least two chain strands, formed from oval chain links and running over sprockets, and conveyor elements which are connected to the chain strands via pairs of projections which engage in the free inner space between two successive chain links oriented perpendicular to the sprocket axis, the shortest distance $a_{min}$ between the free ends of the projections of each pair of projections in the operating position being smaller than the length L of the particular chain link gripped by the projections in the manner of a fork, and one of the projections having an arcuate outline on the side facing the front of this chain link.

A chain conveyor of the above type is known from German Offenlegungsschrift No. 2,413,661, wherein in each case a projection formed by a cylindrical bolt and a projection having an arcuate outline are fixed to a carrier. When assembling this chain conveyor, initially the carriers with the projections are pivoted in each case into two successive chain links oriented perpendicular to the axes of the sprockets and, subsequently, conveyor elements, such as scrapers, buckets or the like, are connected to the carriers suspended in the chain strands.

The known chain conveyor cannot be fully satisfactory inasmuch as it can be fully loaded in only one direction of revolution, or reverse running under full load entails problems, because the projections formed by cylindrical bolts are less suitable than the projections having an arcuate outline for the transmission of large drive forces. Moreover, in the case of serious faults, such as, for example, a chain running off a sprocket, it is not possible, in the case of the known chain conveyor, reliably to prevent a separation of the conveyor elements from the chain strands. Finally, the use of carriers, which necessarily are detachably connected to the conveyor elements, proves to be involved and inappropriate in certain applications.

It is the object of the invention to provide a chain conveyor of the type under consideration, which operates perfectly both in forward running and reverse running and in which the conveyor elements can be connected in a particularly simple manner, and so that they cannot be lost, to chain strands which are already assembled and tensioned.

According to the invention, this is achieved when the second projection also has an arcuate outline on one side and at least one of the projections of each pair of projections is pivotably mounted on the conveyor element in such a way that it can be transferred from an assembly position, in which its side with the arcuate outline faces away from the front of the chain link gripped by the projections and the distance $a_{min}$ is greater than the length L, into the operating position in which the sides, having arcuate outlines, of both projections face the fronts of this chain link.

The chain conveyor according to the invention has the advantage that therein the projections reliably grip around the chain links associated with them and that similarly favourable force transmission conditions between the particular chain links gripped and the projections apply both in forward running and in reverse running. Assembling of the conveyor elements is extremely simple, and the use of exchangeable projections is possible. Since both projections can be of identical design, the stockholding costs can be reduced.

In the following text, the invention is explained in more detail by reference to the attached drawings in which:

FIG. 2 shows the parts, serving to fix one side of a conveyor element, in an intermediate assembly position, on a scale enlarged relative to FIG. 1;

FIG. 3 shows a section along the line III—III in FIG. 2;

FIG. 4 shows the parts according to FIG. 1, after assembly has been completed;

FIG. 5 shows a section or a view along the line V—V in FIG. 4;

FIG. 6 shows a view of the parts of FIG. 4, seen from the left and with the chain omitted;

FIG. 7 shows a representation, corresponding to FIG. 2, in a modified illustrative embodiment;

FIG. 8 shows a section along the line VIII—VIII in FIG. 7;

FIG. 9 shows the ready assembled fixing arrangement of the arrangement example according to FIG. 7, partially in section along the line IX—IX in FIG. 11;

FIG. 10 shows a section or a view along the line X—X in FIG. 9;

FIG. 11 shows a view of the parts according to FIG. 9, seen from the left and with the chain omitted;

Figure 1:
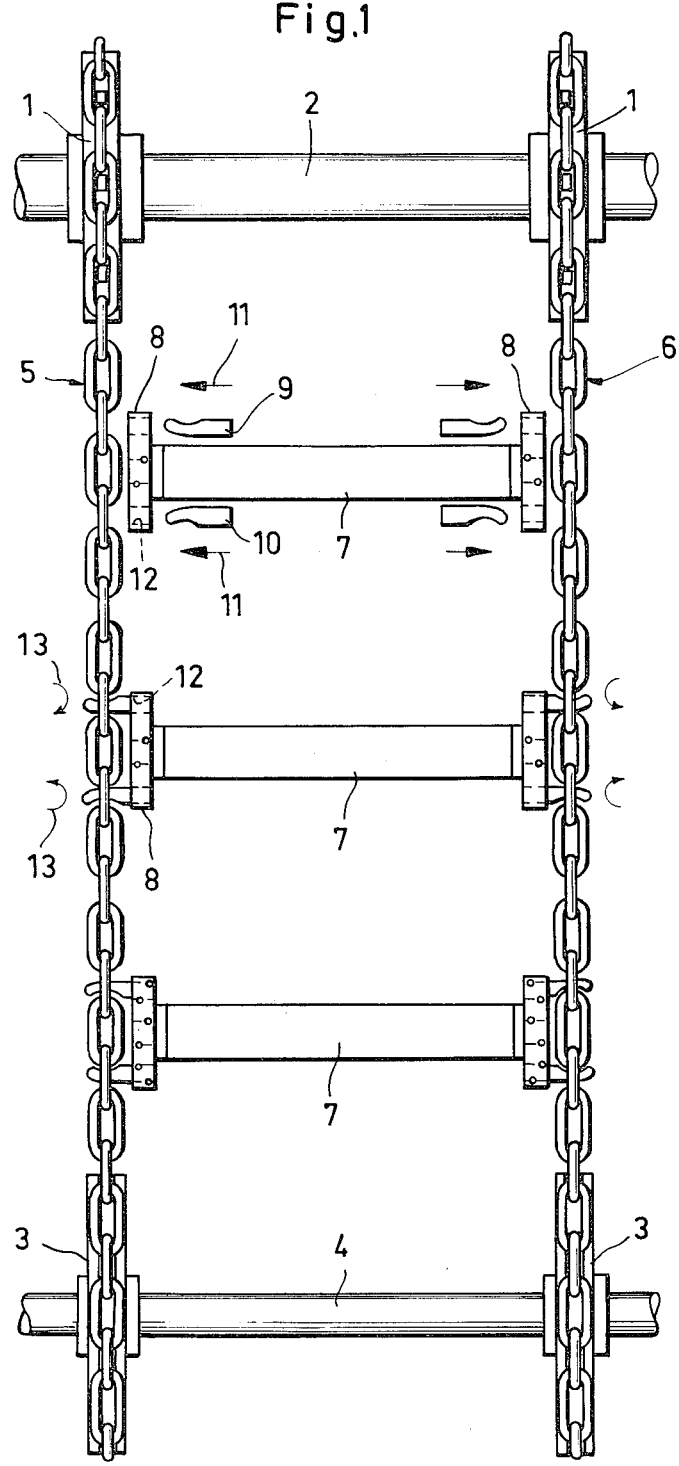
FIG. 1 shows a plan view of the essential parts of a chain conveyor with three conveyor elements shown in different assembly positions.

In FIG. 1, two toothed sprockets arranged on an axis 2 are marked 1 and two grooved sprockets arranged on an axis 4 are marked 3, two chain strands 5 and 6 being guided over these sprockets. Conveyor elements 7 are fixed to the chain strands. At their ends, these conveyor elements have carriers 8 which are to receive projections 9 and 10 and the form of which is described in more detail below. The projections 9 and 10 are pushed in the direction of the arrows 11 into bores 12 in the carriers 8 and are then pivoted about their axis, as indicated by the arrows 13. The lowest of the conveyor elements 7 shown has been completely assembled.

Details of the fixing arrangement, shown in FIG. 1, for the conveyor elements are shown in FIGS. 2 to 6.

A stud 14 of the conveyor element 7 protrudes into a bore 15 in the carrier 8. Braces 16 ensure that the conveyor element and the carrier 8 are held together. FIG. 2 shows the moment of insertion of a projection 9 into the upper bore 12 of the carrier 8. This projection has a pivot pin 17 provided with locking recesses 18 which are arranged at a mutual offset in the direction of the axis of the pivot pin. Each projection has a side 19 which has an arcuate outline and preferably forms a centering recess in which, in the assembled state (compare FIG. 4), in each case one of the fronts 20 of a chain link 21 gripped by the projections 9 and 10 in the manner of a fork can be supported.

As can be seen particularly from FIGS. 2 and 3, the pivotable projections have an approximately circular cross-section in the support zone of their arcuate side, the center point 22 of this cross-section lying on the pivot axis 23 of the particular pivot pin 17. After the projection 9 has been inserted into the upper bore, the two projections 9 and 10 assume a position in which their sides 19 of arcuate outline face away from the fronts 20 of the chain link 21. Subsequently, they are rotated in the direction of the arrow 13 about their pivot axes 23, and in particular by an amount of 180°. After this pivot motion, they assume the position which is shown in FIG. 4 and in which they are secured by locking elements 24 formed by tensioning pegs or tensioning sleeves seated in bores 25 which intersect the bores 12.

As can best be seen from FIG. 4, the projections 9 and 10 grip the chain link 21 in a manner which makes a separation of the conveyor element 7 from the chain strand 5 impossible. This is so because the dimension $a_{min}$ is markedly smaller than the dimension L, and the small distance between the carrier 8 and the arms of the chain link 21, which face the carrier, makes it impossible for the chain link 21 to pivot out of the position, in which it is gripped in the manner of a fork, even if the chain has run off.

In the illustrative embodiment according to FIGS. 7–10, the projections 26 and 27 used have pivot pins 28 which are mounted in a similar manner as the projections 9 and 10 of the illustrative embodiment described above. In this case, the conveyor elements 7 are each rigidly joined by weld seams 29 to a carrier 30. A plate 31 bears against the carrier 30. Mutually aligned bores 12 through which the projections can be inserted pass through the carrier and the plate 31. At their ends facing away from the chain strands, the projections 26 and 27 have threaded bolts 32. The pivot pins 28 are provided with grooves 33 and, as can be seen from FIG. 7, protrude outwards beyond the side face of the plate 31. The grooves 33 serve to lock the projections 26, 27 in their working position. Parts of a locking plate 34 provided with recesses which fit the grooves engage in the grooves 33. The locking plate 34 is tightened against the outside of the plate 31 by means of nuts 35 which are supported via washers 36 against the carrier 30. In the second illustrative embodiment, the chain links 21 is also gripped securely by the sides 19, which form centering recesses, of the projections 26, 27. The distance x between the chain link and that side of the locking plate 34 which faces the chain link is so small in this case also that the chain link 21 is secured against an inadvertent separation of the conveyor element 7 from the chain, even if the chain 5 has run off.

Figure 12:
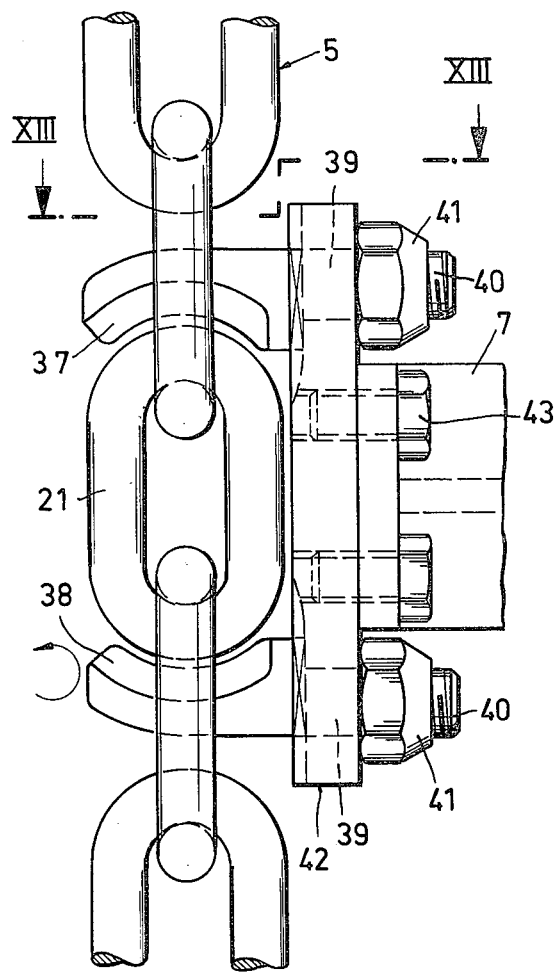
FIG. 12 shows a representation, corresponding to FIGS. 4 and 9, of a third illustrative embodiment.
Figure 14:
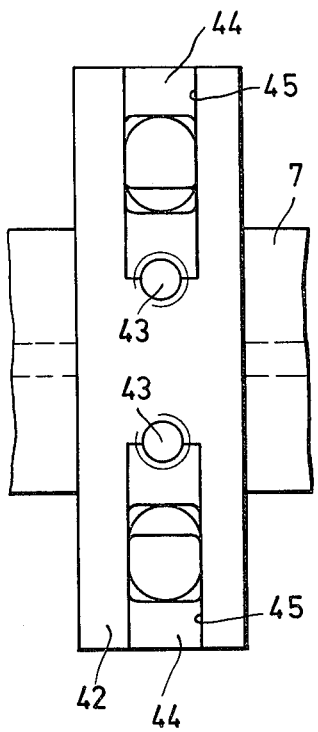
FIG. 14 shows a view of the parts according to FIG. 12, seen from the left and with the chain omitted.
Figure 13:
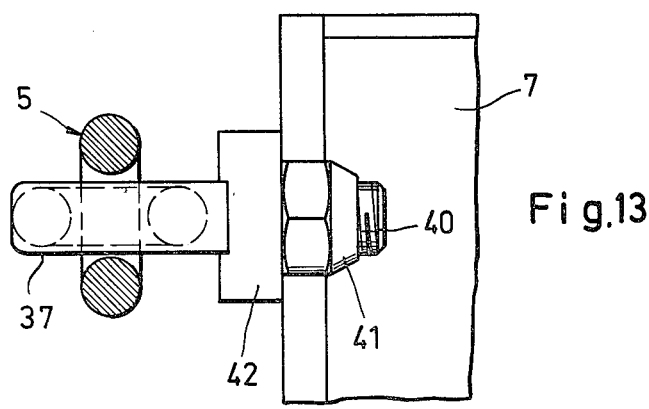
FIG. 13 shows a section or a view along the line XIII—XIII in FIG. 12.

Finally, FIGS. 12–14 show a fixing arrangement with projections 37 and 38 which are provided with pivot pins 39, the ends 40 of which have threads for receiving clamp nuts 41. The pivot pins protrude into bores of a carrier 42 which is joined to a conveyor element 7 by means of bolts 43. On its side facing the chain strand 5, the conveyor 42 is provided with substantially rectangular grooves 44. The lateral boundaries of these grooves 44 form abutment surfaces 45 which come to bear against surfaces of the projections 37 and 38 and secure the projections against rotational movements.

We claim:

1. A chain conveyor having at least two chain strands, formed from oval chain links and running over sprockets, and conveyor elements which are connected to the chain strands via pairs of projections which engage in the free inner space between two successive chain links oriented perpendicular to the sprocket axis, the shortest distance $a_{min}$ between the free ends of the projections of each pair of projections in the operating position being smaller than the length L of the particular chain link gripped by the projection in the manner of a fork, and one of the projections having an arcuate outline on the side facing the front of this chain link, wherein the second projection (10; 27) also has an arcuate outline on one side and at least one of the projections (9, 10; 26, 27; 37, 38) of each pair of projections is pivotably mounted on the conveyor element (7) in such a way that it can be transferred from an assembly position, in which its side with the arcuate outline faces away from the front (20) of the chain link (21) gripped by the projections (9, 10; 26, 27; 37, 38) and the distance $a_{min}$ is greater than the length L, into the operating position in which the sides, having arcuate outlines, of both projections (9, 10; 26, 27; 37, 38) face the fronts (20) of this chain link (21).

2. A chain conveyor as claimed in claim 1, wherein at least one of the projections (9, 10; 26, 27; 37, 38) of each pair of projections is provided with a pivot pin (17; 28; 39).

3. A chain conveyor as claimed in claim 1 or 2, wherein each pivotable projection (9, 10; 26, 27; 37, 38) can be locked in its working position by locking elements (24; 34; 45).

4. A chain conveyor as claimed in claim 3, wherein the locking elements (24) are formed by tensioning sleeves or pegs, which engage in locking recesses (18) on the periphery of the pivot pins (17).

5. A chain conveyor as claimed in claim 4, wherein each pivot pin (17) is provided with two locking recesses (18) which are arranged at a mutual offset in the direction of the axis of the pivot pin.

6. A chain conveyor as claimed in claim 2, wherein the pivot pins (17, 28) are mounted in bores (12) in carriers (8; 30) which are connected to the conveyor elements (7).

7. A chain conveyor as claimed in claim 6, wherein the particular projection (9, 10; 26, 27) can be pushed through the bore (12) associated therewith.

8. A chain conveyor as claimed in claim 3, wherein the locking elements are formed by abutment surfaces (45) on the carrier (42).

9. A chain conveyor as claimed in claim 8, wherein the abutment surfaces (45) are formed by side walls of grooves (44) in a carrier (42) which is detachably joined to a conveyor element (7).

10. A chain conveyor as claimed in claim 1 or 2, wherein at least the pivotable projections (9, 10; 26, 27; 37, 38) have an approximately circular cross-section in the support zone of their arcuate side (19).

11. A chain conveyor as claimed in claim 10, wherein the center point (22) of the cross-section lies on the pivot axis (23) of the pivot pin (17; 28).

12. A chain conveyor as claimed in claims 1 or 2, wherein the sides (19), having arcuate outlines, of the projections (9, 10; 26, 27; 37, 38) form centering recesses for the fronts (20) of the particular chain link (21) gripped by them in the manner of a fork.

13. A chain conveyor as claimed in claims 1 or 2, wherein at least one projection (9, 10; 26, 27; 37, 38) is exchangeable.

14. A chain conveyor as claimed in claims 1 or 2, wherein the projections (9, 10; 26, 27; 37,38) of each pair of projections have the same shape.

15. A chain conveyor as claimed in claims 1 or 2, wherein the projections (26, 27) are held by carriers (30) which are rigidly joined to the conveyor elements (7).

* * * * *